May 27, 1958 W. R. JOHNSON 2,836,651
METHOD OF RECORDING AND REPRODUCING WIDE-BAND SIGNALS
Filed Oct. 31, 1956
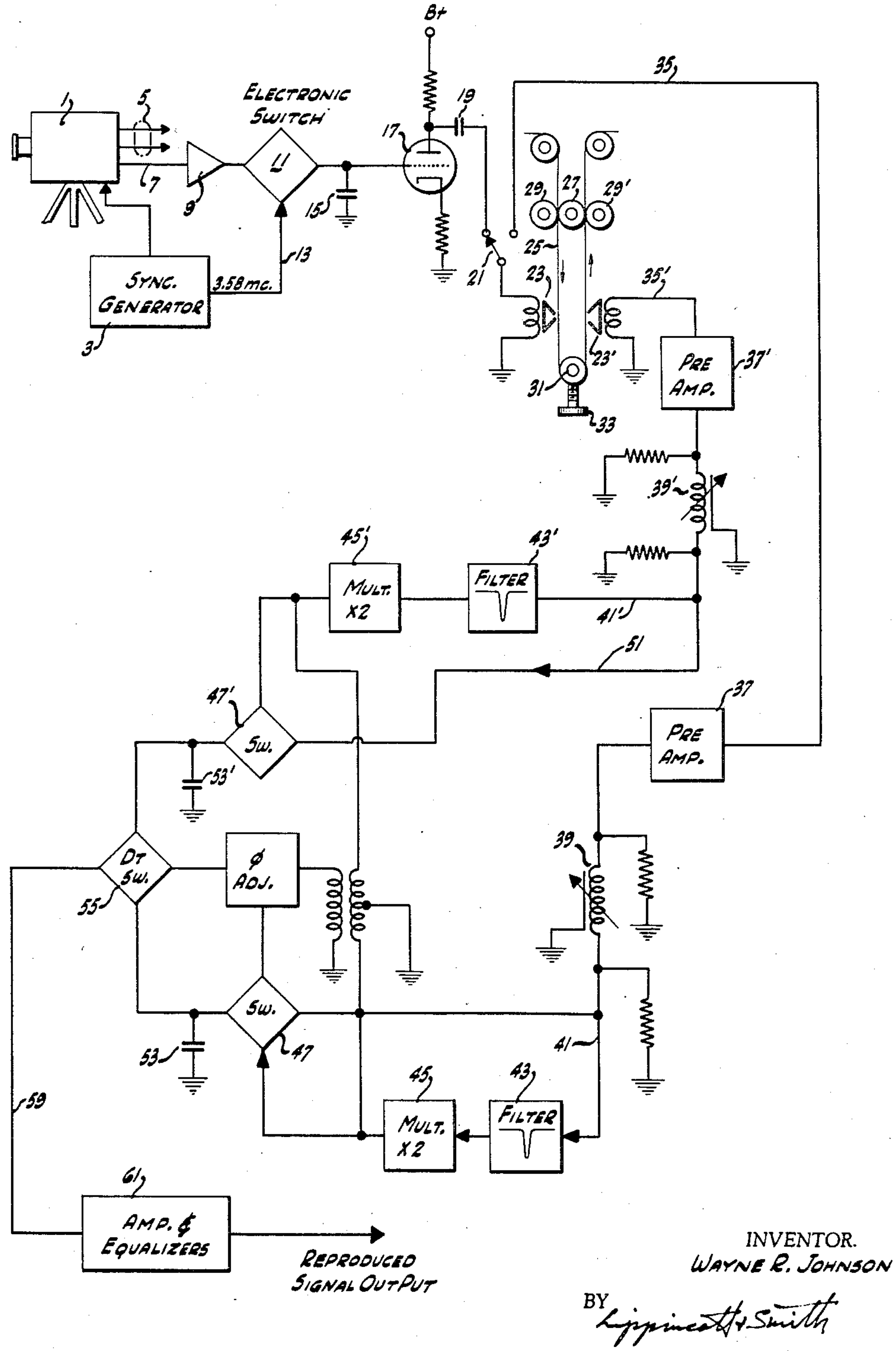
INVENTOR.
WAYNE R. JOHNSON
BY Lippincott & Smith
ATTORNEYS United States Patent Office 2,836,651
Patented May 27, 1958

2,836,651

METHOD OF RECORDING AND REPRODUCING WIDE-BAND SIGNALS

Wayne R. Johnson, Los Angeles, Calif., assignor to Minnesota Mining and Manufacturing Company, St. Paul, Minn., a corporation of Delaware Application October 31, 1956, Serial No. 619,459

3 Claims. (Cl. 178—6.6)

This invention relates to the recording of signals on and their reproduction from a moving recording medium, such as a magnetic tape, by a band splitting method that permits the speed of the medium to be reduced to a fraction of the value that would be required for direct recording and reproduction of signals carrying the same information. It is therefore particularly applicable to the recording of signals occupying a very wide frequency band and particularly television signals.

Prior United States Patent No. 2,694,748 for a Television Signal Reproducing System, issued November 16, 1954, to the present inventor, discloses a method of band-splitting wherein the signal to be reproduced is sampled by a series of pulses of short duration and alternating sign with a repetition frequency at or near the cut off frequency of the recording and reproducing apparatus. The result is a modulated pulse train, carrying bits of information derived from the original signal, which are separated in time. To produce a 2:1 splitting of the frequencies as recorded, the samplings, positive and negative, are so timed as to represent the light intensity of alternate elementary areas of the field of view being scanned. To carry the entire information of the picture a separate sampling is accomplished in the same manner by pulses whose fundamental frequency is electrically in quadrature with those in the first sampling, thus representing the intermediate bits of information, omitted in the first sampling. Such a modulated pulse train as results from the sampling process, when recorded and reproduced has the components of higher frequencies than the fundamental scanning rate removed by the reproduction process and the result has substantially the characteristics of a modulated sine wave. Such a wave can be demodulated by means of a pulse train of the sampling frequency to reinvert the alternate samples and yield a signal carrying the alternate bits of information in their proper polarity. Two such sampled pulse trains can be combined to reproduce substantially all of the information of the original signal.

Television signals are basically unidirectional; there is no such thing as "negative light" and the result of scanning any individual area of a field of view is therefore always either zero or positive as regards the light represented by it, although electrically it may be negative in sign. In the process just described, wherein successive samples are inverted in polarity, low frequency components of the signal to be recorded are represented by components at or near the cut off frequency.

One of the difficulties encountered in magnetic recording is that of "drop-outs." Such drop-outs result from imperfections in the magnetic recording medium, such as minute pin holes, or granules which may lift a magnetic tape from the recording head or transducer. When a wide band of frequencies is recorded it is the high frequencies components that are most susceptible to drop-outs. As the upper cut-off frequency is approached the elemental magnets that constitute the record become shorter and shorter and therefore more and more subject to self-demagnetization. Furthermore, due to the well known aperture effect, the reproduced signals become progressively weaker as the ultimate cut off is approached, both because, in recording, successive half-cycles partially overlap, and because, in reproduction, the change in magnetization at the leading edge of the aperture or gap becomes more and more out of phase with the change at the trailing edge, tending to produce a cancellation of the signals. In recording signals of relatively low frequency these effects are negligible, the magnetization of the magnetic coating penetrates more deeply into the tape and a defect which penetrates only the surface layers of the coating will have no appreciable effect on the reproducer output.

The objects of the present invention include the provision of a system of band-splitting which retains the advantages of the sampling method above described but which does not convert low frequencies or direct current components into high frequency waves; the provision of a method of band-splitting which provides a greater latitude in the epochs of sampling the reproduced wave without affecting the amplitude of the sampled pulses; the provision of a band splitting method which is resistant to the effects of drop-out, and the provision of a band splitting method that can be accomplished with relatively simple and reliable apparatus. A further object of the invention is to provide a band-splitting method that is applicable to the reproduction of a substantially the complete information comprised in a television signal from a single track, carrying only one-half of the information comprised in each frame, the information omitted being supplied by the scanning of a succeeding frame by "dot interlace." The method of accomplishing this latter process is claimed in a concurrently filed application of the present inventor.

In accordance with the present invention the signal to be reproduced is sampled by (or modulated on) a train of unidirectional pulses whose frequency is approximately double the cut off frequency of the apparatus used. The energy contained in each pulse is stored during the interval preceding the next pulse, resulting in a voltage wave which is a succession of steps, and it is this stepped wave that is recorded. Because this wave does not drop to zero or reverse in sign between samples, and because the high frequency components are removed by the filtering action of the aperture effect, the highest frequency component present in the stepped wave as reproduced is one-half of the sampling repetition frequency. As reproduced the wave rises to its maximum value in each step in about one-half cycle of the cut-off frequency (postulated as one-half the sampling repetition frequency), resulting in a stepped wave wherein the rise is gradual instead of abrupt. The reproduced wave is resampled, again by unidirectional pulses at double the cut-off frequency, resulting in a pulse train that can be dot interlaced with a similar train representing the omitted information to constitute substantially a reproduction of the original signal. The second pulse train can be derived from a second track, recorded simultaneously with the first, or it can be derived from the record of a succeeding frame recorded on the same track. One further operation is a desirable but not an essential feature of the invention. In accordance with this additional feature the pulses developed by the sampling operation last described are again stored during the inter-pulse period in the same manner as in the recording procedure, to produce two stepped waveforms, and these two stepped waves are sampled alternately by pulses each occupying one-half cycle of the sampling frequency. The pulses employed for the final sampling are preferably opposite half-cycles of the same sampling wave, and the latter is preferably derived by taking the average of the two individual waves that accomplish the first sampling in the reproduction process. This last step accomplishes two purposes; it insures complete and perfect interlace of the waves derived from the two reproducing channels and it gives an additional latitude of approximately one-quarter cycle of the sampling frequency in the exact phasing of the waves from the two sources.

The invention is described in greater detail in what follows, the description being illustrated by the accompanying drawing wherein the single figure illustrates the invention as applied in a single track system wherein only one half of the detail in each frame is recorded, the detail omitted being supplied from the succeeding frame by a system of dot interlace.

It will be understood that as far as the system of sampling is concerned, to which this specification is particularly directed, the two reproduced signals could be equally well recorded simultaneously on separate tracks. The recording system is shown to illustrate one way in which the two simultaneously reproduced tracks can be recorded so that the two signals have the required phase relationship in reproduction. The apparatus which follows the playback heads will be identical, whether the signals simultaneously played back are recorded sequentially and the playback heads separated in space along the track or whether the signals are recorded concurrently and the two playback heads are mounted side-by-side in the same transducer assembly.

The drawing illustrates only equipment involved in the recording and reproducing of a single high-frequency channel. The channel shown could be that carrying the entire information desired from scanning a field for monochrome reproduction, or it could be either the luminance signal used in transmitting a color picture in accordance with present standards or the "mixed high" components of such a picture. In any case additional channels would be required. For monochrome a separate channel would be used for carrying the accompanying sound, and, in accordance with some systems, a pilot or synchronizing frequency would be superimposed upon the sound signal for maintaining the average speed of the tape constant. In transmitting color pictures additional tracks would be required for carrying the chrominance information; as only relatively low-frequency components of such information are transmitted this information can be recorded directly. The requirements for synchronization here are not as rigorous as those for the interlace of the picture elements in the high-frequency range and therefore these components can be carried by tracks positioned on the tape on either side of the high-frequency track to which the method of the present invention applies.

In the showing of Fig. 1 the original signal to be operated upon is assumed to be developed by a television camera 1, supplied with its scanning, blanking and synchronizing signals from a standard sync generator 3. Assuming the camera 1 is for the transmission of color, it will supply additional channels 5, not shown in detail, as well as the channel 7 which carries the luminance signal or (perhaps) a green signal plus the mixed highs. The signals in this channel, after passing through an amplifier 9, are supplied to an electronic switch 11.

Any one of a large number of switching or gating arrangements can be used for the switch 11. One suitable switch of this character is illustrated in Fig. 319, page 54, of "Waveforms," vol. 19, Radiation Laboratories Series (McGraw-Hill, 1949), and various other types of carrier-balanced, half-wave modulators can be used, provided a storage condenser is used in the output circuit as will be described hereinafter. The necessary characteristic of the switch employed is that it be phase-sensitive, the output voltage reversing in sign with reversal of the signal to be sampled. In the present instance it is driven by the color sub-carrier frequency, which under present standards of transmission is the 455th harmonic of one-half the line frequency or the 34,025th harmonic of one-half the frame frequency. This is equal to 3,579,545 cycles per second, but for convenience will be hereinafter referred to as the "3.58 mc." frequency. This frequency is available from a standard color sync generator, and is supplied to the switch 11 through lead 13. Switch 11 is so biased as to close its circuit to output lead 7' only on the positive peaks of the 3.58 frequency, thus passing on, to its output circuit, short pulses or samples of the original television signal every 0.28 microsecond.

The pulses thus produced charge a small condenser 15 to the instantaneous voltage of the sample, thus deriving from the original signal a related signal in which the voltage changes by successive steps, each new voltage persisting for 0.28 microsecond. The step voltage thus produced is applied to the grid of a triode 17. The amplified output from this tube is supplied through a blocking condenser 19 and a mechanical switch 21 to the winding of a transducer head 23, which imposes the signal upon tape, schematically indicated at 25.

The tape is driven at constant speed by a drive-capstan 27, against which the tape is held by a pair of nip rollers 29 and 29'. In accordance with known practice the speed of the capstan and tape are held at a constant value by a feedback arrangement, not shown. Various forms of such mechanisms are well known in the recording art. Neither are the reels on which the tape is carried illustrated nor the tensioning devices, and for the same reason.

The transducer head 23 used in the recording process is identical in construction with a second transducer head 23'. After passing the capstan and the recording head 23 the tape goes around a reversing roller or guide 31 and returns between the capstan and nip roller 29' passing on the way the second transducer head 23'. The transducer heads are fixed in position but the reversing guide or roller is adjustable by means of a micrometer screw 33 so that the distance between the points of contact of heads 23 and 23' can be made precisely equal to the distance traversed by the tape during the frame interval of substantially $\frac{1}{30}$ second.

In the present instance it is assumed that the heads will reproduce frequencies up to one-half the 3.58 mc. sampling frequency. At 10 kc. per inch this argues a tape speed of approximately 180 inches per second and therefore the separation of the two transducer heads, as measured along the tape path, should be almost exactly six inches. Because of the very short wavelength for the maximum frequencies to be recorded, however, adjustment of the exact distance to insure that the two heads contact the track at exact equal epochs of successive frames is very critical, even with an extremely accurately calibrated micrometer screw. The adjustment by purely mechanical means is contemplated as within the scope of the invention but it is preferred to make only the initial adjustment mechanically in this fashion, and to obtain a final synchronization between the signals by electrical means, as will be described later.

Although the sampling rate of the signals applied to the tape is 3.58 mc., because of the action of the storage condenser 15 the signal does not drop to zero between samples and as a result the sampling frequency appears in the record, where it does appear, with a major component at a frequency of one-half 3.58, or 1.79 mc. per second. This component appears only when the value of illumination of the portion of the field being scanned is changing. Owing to the aperture effect of the gaps in the transducer heads the still higher frequency components due to the successive 0.28 microsecond steps are filtered out in reproduction and therefore, on playback, the samples rise and fall gradually.

On playback the switch 21 is thrown to reverse position from that shown so that the recording head 23 now becomes a reproducer or playback head, connected to equipment which is identical with that supplied by the head 23'. The signals played back from head 23 are supplied through lead 35 to a preamplifier 37 and thence to a variable delay line 39. Beyond the delay line the circuit divides; one branch of the circuit leads through connections 41 to a very narrow pass-band filter tuned to the 1.79 mc. frequency; e. g., a crystal filter. This filter has a long ringing period and selects from the signals supplied to it the dominant 1.79 mc. component of the sampled waves. This component goes in turn to a 2:1 multiplier 45, maintained at the verge of oscillation so that it, too, tends to ring, giving a constant output of the 3.58 sampling frequency. The positive crests of the sampling frequency operate an electronic switch 47, which may be identical with the switch 11. Switch 47 is inserted in the second branch 51 of the delay line output circuit; when it closes, instantaneously, it charges condenser 53 in the same manner that switch 11 charges condenser 15 as already explained.

The circuit from transducer head 23' is identical with that to which head 23 is connected for playback. The equipment in this circuit is therefore designated by the same reference characters as those just described but distinguished by accents.

The voltages developed across condensers 53 and 53' are supplied to what is, in effect, a double-throw electronic switch 55. The operating potentials for this switch can be derived from either multiplier 45 or 45'. In the present case the operating frequency for the switch is derived from both multiplier 45, 45', connected in push-pull, and is supplied through a phase adjuster 57 to the switch 55. The addition of the two separately derived sampling oscillations results in a sampling wave of their average phase. The switch 55 is so arranged that it closes the circuit to condenser 53 on, say, the positive peaks of the operating frequency, whereas the circuit to condenser 53' is closed on the negative peaks. Instead of a single double-throw switch at 55, two alternately operated switches of the same kind as switch 11, connected back-to-back, can be used. The resultant output is successive pulses, each one-half cycle of the switching frequency long, which are interlaced and are supplied through output lead 59 to the usual amplifier and equalizers 61. The output from the latter connects to a television transmitter or transmission line. It should be noted here that the pulsed outputs from switches 47 and 47' can be combined directly and supplied to amplifier and equalizers 61 without the additional storage in condensers 53, 53' and resampling, provided the adjustments of the phasing screw 33 and the delay lines 39, 39' are exact and there is no phase deviation in the sampling frequencies. The resampling technique, however, gives an additional latitude of adjustment, and using the same wave for sampling in the final step assures absolute interlace.

The sampled signals resulting from the scanning process may be considered without serious error as being recorded on the tape in their stepped form but, as has been mentioned, in reproduction the high frequency components of the step functions are filtered out. As reproduced, the resulting steps will attain their maximum value in substantially one-half cycle of the 1.79 mc. frequency so that if sampled during the final 0.14 microsecond of their persistance the reproduction will be at their true value. The samples are taken of alternate elementary areas of the picture field in successive frames and in order to get exact interlace, as required to present a complete and satisfactory picture, it is necessary that the signals that are present coincidentally at the switches 47 and 47' represent exactly the same phases or epochs of the scanning cycles of the two successive frames. To attain this result by mechanical adjustment of the micrometer screw 33 is possible but difficult of achievement. It is for this reason that the variable delay lines 39 and 39' are provided. Such delay lines may be adjustable through several cycles of the sampling frequency; by playing back a recorded image on a monitor it is possible to compare the phases of the signals in the two channels and, if there is any discrepancy in the mechanical adjustment, to delay the phase of the more advanced sufficiently to bring about the interlaced relationship. Furthermore, it is not necessary that the delay lines 37 and 37' be manually adjustable; in copending application Serial No. 610,436 of the same inventor filed September 4, 1956, there is described and illustrated a method of electronically comparing the phases of two signals and delaying the more advanced to bring the two into time coincidence. This technique can be employed here if desired, although ordinarily the additional complication is not required.

One reason that it is unnecessary to use automatic and continuous adjustment of the delay lines is the fact that the resampling technique used for finally mixing the signals offers some additional latitude in sampling time. The charges on each condenser persist for 0.28 microsecond but the samples are only 0.14 microsecond long. Therefore the final samples will interlace properly even though there may be as much as 0.14 microsecond departure from the proper phase-relationship of the signals as stored on condensers 53 and 53'. The use of the average phase of the two sampling waves insures that sampling of both channels will be accomplished as long as the 0.14 microsecond tolerance is not exceeded.

Of course it is possible to derive the sampling frequencies from a separately recorded pilot channel, or from a local oscillator held in step by bursts of the color sub-carrier (divided by 2) as in the case of color receivers.

While the method of sampling contemplated by this invention has been described in connection with the recording of all information on a single track, it should be obvious that it is equally applicable to systems wherein samples intermediate those recorded on one track are simultaneously recorded on a second one, the sampling being accomplished, for example, by alternate positive and negative pulses of the same sampling frequency. The same problems of phasing occur in multiple track recording but due to slightly different causes; skew in the angle of the recording or reproducing head assembly can cause the same effect as improper spacing of the two reproducing heads and this can be corrected by the delay lines, equivalent to lines 39, 39'. Flutter of ordinary magnitude can be compensated for by the final resampling process. If it exceeds one-half cycle of the sampling frequency it can be corrected by the automatic comparison and electrically variable delay line disclosed in the copending application above identified.

The invention is therefore not limited to its employment in the particular apparatus shown and described herein, all intended limitations being specifically expressed in the claims which follow.

I claim:

1. The method of recording and reproducing, from a moving medium, wide-band signals including signals of higher frequency than the cutoff frequency of the apparatus employed, which comprises the steps designated as steps (*a*) (*e*) and defined as follows: to step (*a*) sampling the signals to be reproduced at intervals equal to one period of the highest frequency to be reproduced to produce a series of pulses of the same polarity as that of the signals sample; step (*b*) storing the energy of each pulse for the interval between pulses to produce a stepped voltage wave; step (*c*) recording the wave produced in step (*b*) on said moving recording medium to produce a record track carrying one-half of the information of the signal sampled in step (*a*); step (*d*) playing back the record produced in step (*c*); and step (*e*) resampling the resultant wave from step (*d*) at intervals equal to the sampling intervals of step (*a*) to produce a train of pulses of short duration as compared to said intervals and proportional in magnitude to the magnitude of the original signals at the instants of sampling in step (*a*).

2. The method of recording and reproducing, from a moving medium, wide-band signals including signals of higher frequency than the cutoff frequency of the apparatus employed, which comprises the steps designated as steps (*a*) to (*g*) and defined as follows: step (*a*) sampling the signals to be reproduced at intervals equal to one period of the highest frequency to be reproduced to produce a series of pulses of the same polarity as that of the signals sampled; step (*b*) storing the energy of each pulse for the interval between pulses to produce a stepped voltage wave; step (*c*) recording the wave produced in step (*c*) on said moving recording medium to produce a record track carrying one half of the information of the signal sampled in step (*a*); step (*d*) recording on said medium a further track produced by like steps (*a*) through (*c*) and substantially representative of the instantaneous magnitude of said signal to be reproduced in the intervals between the samplings described in step (*a*); step (*e*) simultaneously playing back the signals recorded in steps (*c*) and (*d*); step (*f*) sampling the signals played back in step (*e*) alternately, each at intervals equal to the intervals between the samplings described in step (*a*) to produce two trains of pulses each representative of one-half of the information to be carried by the reproduced signal; and step (*g*) combining said trains of pulses to reproduce substantially the entire signal.

3. The method of recording and reproducing, from a moving medium, wide-band signals including signals of higher frequency than the cutoff frequency of the apparatus employed, which comprises the steps designated as steps (*a*) to (*i*) and defined as follows: step (*a*) sampling the signals to be reproduced at intervals equal to one period of the highest frequency to be reproduced to produce a series of pulses of the same polarity as that of the signals sampled; step (*b*) storing the energy of each pulse for the interval between pulses to produce a stepped voltage wave; step (*c*) recording the wave produced in step (*c*) on said moving recording medium to produce a record track carrying one half of the information of the signal sample in step (*a*); step (*d*) recording on said medium a further track produced by like steps (*a*) through (*c*) and substantially representative of the instantaneous magnitude of said signal to be reproduced in the intervals between the samplings described in step (*a*); step (*e*) simultaneously playing back the signals recorded in steps (*c*) and (*d*); step (*f*) sampling the signals played back in step (*e*) alternately, each at intervals equal to the intervals between the samplings described in step (*a*) to produce two trains of pulses each representative of one-half of the information to be carried by the reproduced signal; step (*g*) storing the energy of each of the pulses of each of said trains for the intervals between the successive pulses therein to develop two stepped voltage waves; step (*h*) sampling alternately each step of the stepped waves produced in step (*g*) to produce two new trains of pulses; and step (*i*) combining the pulse trains produced in step (*h*) to produce a complete signal.

No references cited.

UNITED STATES PATENT OFFICE

Certificate of Correction

Patent No. 2,836,651 May 27, 1958

Wayne R. Johnson

It is hereby certified that error appears in the printed specification of the above numbered patent requiring correction and that the said Letters Patent should read as corrected below.

Column 2, line 28, for "of a substantially" read —of substantially—; line 63, for "Iu" read —In—; column 6, line 62, for "(*a*) (*e*)" read —(*a*) to (*e*)—; same line, for "follows: to step" read —follows: step—; column 7, line 14, and column 8, line 9, for "step (*c*)" read —step (*b*)— in each occurrence; column 8, line 11, for "sample" read —sampled—.

Signed and sealed this 2nd day of September 1958.

[SEAL]

Attest:
KARL H. AXLINE,
*Attesting Officer.*

ROBERT G. WATSON,
*Commissioner of Patents.*